(12) United States Patent
Powell et al.

(10) Patent No.: US 9,001,822 B2
(45) Date of Patent: Apr. 7, 2015

(54) METHOD AND SYSTEM FOR UTILIZING A 10/100/1G/10G BASE-T PHY DEVICE FOR SINGLE CHANNEL AND SHARED CHANNEL NETWORKS

(75) Inventors: Scott Powell, Carlsbad, CA (US); Mark Berman, Newport Coast, CA (US); Joseph Laurence Cordaro, Irvine, CA (US); Manolito Catalasan, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 669 days.

(21) Appl. No.: 13/296,911

(22) Filed: Nov. 15, 2011

(65) Prior Publication Data

US 2012/0127892 A1 May 24, 2012

Related U.S. Application Data

(63) Continuation of application No. 11/851,574, filed on Sep. 7, 2007, now Pat. No. 8,081,625.

(60) Provisional application No. 60/887,674, filed on Feb. 1, 2007.

(51) Int. Cl.
*H04L 12/66* (2006.01)

(52) U.S. Cl.
CPC ..................................... *H04L 12/66* (2013.01)

(58) Field of Classification Search
None
See application file for complete search history.

*Primary Examiner* — Ayaz Sheikh
*Assistant Examiner* — Blanche Wong
(74) *Attorney, Agent, or Firm* — Oblon, McClelland, Maier & Neustadt, L.L.P.

(57) ABSTRACT

Aspects of a method and system for utilizing a 10/100/1G/10GBase-T PHY device for single channel and shared channel networks are provided. In this regard, at least one switching element may be utilized to configure an Ethernet over twisted pair PHY device for communication over a single and/or shared channel. The switching element may enable switching between a transmitter being coupled to a shared channel and a receiver being coupled to a shared channel. Additionally, the switching elements may be based on whether the transmitter is connected to a standard 10/100/1G/10GBase-T network, or to a single and/or shared channel network, for example. In this manner, the configured PHY device may remain compatible with existing Ethernet networks. The PHY device may be configured externally and/or internally. The polarity of transmitted and/or received data may be configured based on a polarity of data received from a shared channel.

18 Claims, 9 Drawing Sheets

METHOD AND SYSTEM FOR UTILIZING A 10/100/1G/10G BASE-T PHY DEVICE FOR SINGLE CHANNEL AND SHARED CHANNEL NETWORKS

CROSS-REFERENCE TO RELATED APPLICATIONS/INCORPORATION BY REFERENCE

The present application is a continuation of U.S. application Ser. No. 11/851,574 filed on Sep. 7, 2007, which makes reference to, claims priority to and claims the benefit of: U.S. Provisional Patent Application Ser. No. 60/887,674 filed on Feb. 1, 2007.

The above stated application is hereby incorporated herein by reference in its entirety.

FIELD OF THE INVENTION

Certain embodiments of the invention relate to wired networking. More specifically, certain embodiments of the invention relate to a method and system for utilizing a 10/100/1G/10GBase-T PHY device for single channel and shared channel networks.

BACKGROUND OF THE INVENTION

Today's networks are based predominantly on Ethernet (IEEE 802.3) technology. Additionally, for various reasons including cost and ease of manufacture, twisted pair cabling has become the predominant physical medium utilized in local area networks employing Ethernet technology. Ethernet utilizing twisted pair is commonly referred to as 10Base-T, 100Base-TX, 1000Base-T, and 10GBase-T, where the number indicates the data rate, "Base" refers to baseband, meaning no modulation of frequency shifting may be employed, and the "T" refers to twisted pair cabling as the transmission medium.

Because of the popularity of Ethernet and twisted pair cabling, an abundance of 10/100/1000/10Gbase-T physical layer equipment exists in the marketplace and in existing networks. Accordingly, when the appropriate infrastructure is available, 10/100/1000/10Gbase-T may be excellent choices for deploying a lost cost network. Conventional Ethernet networks often utilize a shared channel and rely on the Carrier Sense Multiple Access/Carrier Detect (CSMA/CD) protocol to share the channel. In this regard, CSMA/CD may limit data rates and or distances or number of nodes in a network. Consequently, the cost of installing a 10/100/1000/10GBase-T network in an existing multi-tenant or multi-dwelling unit (MTU/MDU) may be prohibitive due to the cost of purchasing and installing switches (or similar devices) and/or twisted pair cabling.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided utilizing a 10/100/10/10GBase-T PHY device for single channel and shared channel networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
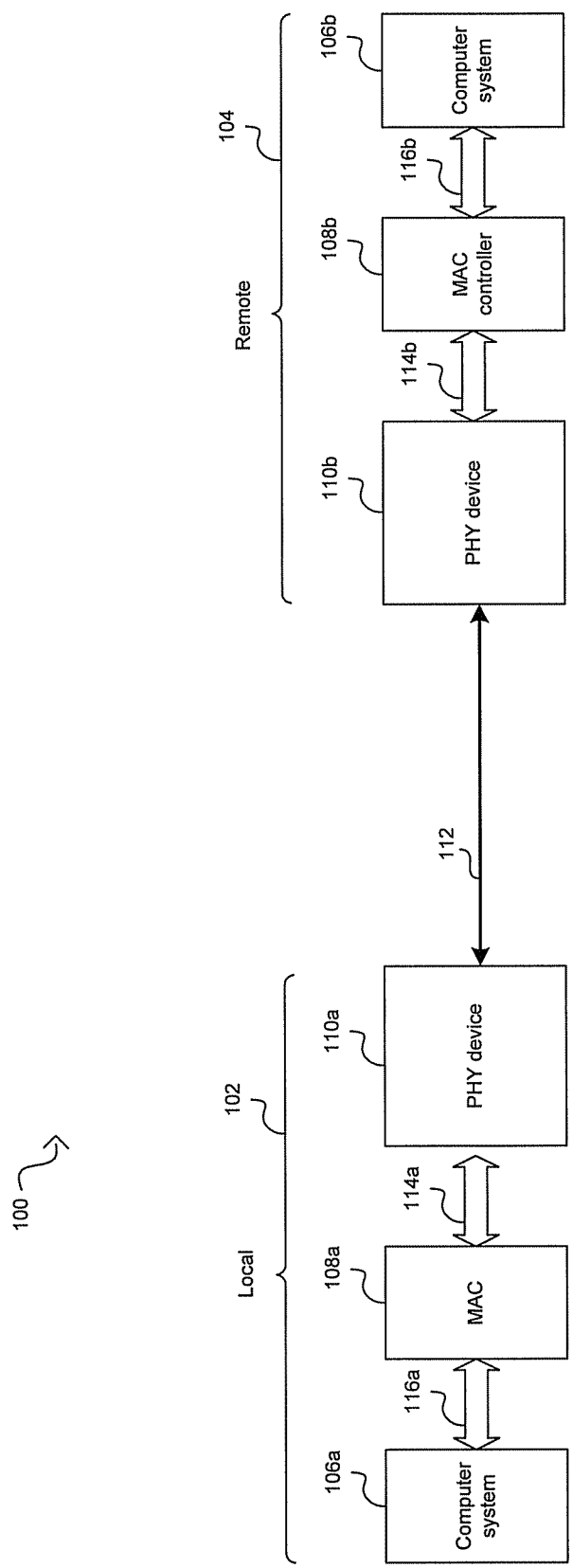
FIG. 1 is a block diagram illustrating an Ethernet over twisted-pair cabling link between a local link partner and a remote link partner, in connection with an embodiment of the invention.

Certain embodiments of the invention may be found in a method and system for utilizing a 10/100/1G/10GBase-T PHY device for single channel and shared channel networks. In this regard, at least one switching element may be utilized to configure a 10/100/1G/10GBase-T PHY device for communication over a single and/or shared channel. In this regard, the switching element may enable switching between a transmitter being coupled to a shared channel and a receiver being coupled to a shared channel. Additionally, the switching elements may be controlled by signals generated in a MAC controller. The control signals may be determined based on whether the PHY device is to transmit or receive and whether the transmitter may be connected to a standard 10/100/1G/10GBase-T network, or to a single and/or shared channel network. In this manner, the configured PHY device may remain compatible with existing Ethernet networks. The PHY device may be configured externally or internally. The PHY device may be enabled to configure the polarity of transmitted and/or received data based on a polarity of data received from a shared channel.

Aspects of the invention may provide an improvement over network implementing CSMA/CD for MTU/MTD applications. In this regard, a node implementing CSMA/CD may first sense if a carrier is present on the channel (by detecting DC voltage on the cable) and transmit only if no carrier is detected. Nonetheless, if a second node goes through the same process, at the same time, then the second node may begin transmitting as well. Consequently, a "collision" may occur on the channel. In this case, a jam signal may be transmitted and the two nodes may then wait for a randomized amount of time before attempting to transmit again. CSMA/CD has the limitation that a maximum collision domain is specified, thus reducing the reach of cabling in multi-node applications. In this regard, although the collision domain may allow for a cable reach of 1000 m in 10BASE-T networks, the collision domain limitation may decrease cable reach to 100 m and 10 m for 100BASE-T and 1000BASE-T networks, respectively. Consequently, cable reach in network implementing CSMA/CD may be insufficient for MTU/MTD applications. Conventionally, collision domains may be reduced by installing hubs or bridges. However, as previously discussed, installing hubs or bridges may be infeasible for MTU/MTD applications due to cost or lack of resources. CSMA/CD also has the limitation that time intervals available for transmission by a node are non-deterministic. In this regard, if multiple collisions occur on the shared channel, then transmission of a packet may be delayed by a pseudo-randomized period of time. However, MTU/MTD applications such as Voice-over-IP (VoIP) do not perform well with random delays in the transmission scheme. CSMA/CD also has the limitation that as a network gets loaded down with many nodes attempting to transmit at the same time, the throughput of the network decreases.

FIG. 1 is a block diagram illustrating an Ethernet connection between a local link partner and a remote link partner, in connection with an embodiment of the invention. Referring to FIG. 1, there is shown a system 100 that comprises a local link partner 102 and a remote link partner 104. The local link partner 102 and the remote link partner 104 communicate via a cable 112. The cable 112 may comprise up to four or more channels, each of which may, for example, comprise an unshielded twisted pair (UTP) or a coaxial cable. The local link partner 102 and the remote link partner 104 may communicate via two or more channels comprising the cable 112. For example, Ethernet over twisted pair standards 10Base-T and 100Base-TX may utilize two pairs of UTP while Ethernet over twisted pair standards 1000Base-T and 10GBase-T may utilize four pairs of UTP.

The local link partner 102 may comprise a computer system 106a, a medium access control (MAC) controller 108a, and a PHY device 104a. The remote link partner 104 may comprise a computer system 106b, a MAC controller 108b, and a PHY device 110b. Notwithstanding, the invention is not limited in this regard.

The PHY device 110a may comprise suitable logic, circuitry, and/or code that may enable communication, for example, transmission and reception of data, between the local link partner 102 and a link partner, such as the remote link partner 104, for example. Similarly, the PHY device 110b may comprise suitable logic, circuitry, and/or code that may enable communication between the remote link partner 104 and a link partner, such as the local link partner 102, for example. The PHY devices 110a and 110b may support, for example, Ethernet operations. The PHY devices 110a and 110b may enable multi-rate communications, such as 10 Mbps, 100 Mbps, 1000 Mbps (or 1 Gbps) and/or 10 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation.

The PHY devices 110a and 110b may utilize multilevel signaling, for example. In this regard, the PHY devices 110a and 110b may utilize pulse amplitude modulation (PAM) with various levels to represent the various symbols to be transmitted. For example, for 1000 Mbps Ethernet applications, a PAM-5 transmission scheme may be utilized in each twisted-pair wire, where PAM-5 refers to PAM with five levels $\{-2, -1, 0, 1, 2\}$. For Ethernet line code operations that support PAM-3, the PAM-3 transmission scheme may be utilized in each twisted-pair wire, where PAM-3 refers to PAM with three levels $\{-1, 0, 1\}$.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE codes that may be communicated between frames of data.

In an exemplary embodiment of the invention illustrated in FIG. 1, the computer systems 106a and 106b may represent layer 3 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The computer systems 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the computer systems 106a and 106b to ensure that packets are suitably formatted and communicated to the PHY devices 110a and 110b. During transmission, each layer adds its own header to the data passed on from the interfacing layer above it. However, during reception, a compatible device having a similar OSI stack strips off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the computer system 106a via a bus controller interface 116a. The MAC controller 108b may communicate with the PHY device 110b via an interface 114b and with the computer system 106b via a bus controller interface 116b. The interfaces 114a and 114b correspond to Ethernet interfaces that comprise protocol and/or link management control signals. The interfaces 114a and 114b may be multi-rate interfaces and/or media independent interfaces (MII). The bus controller interfaces 116a and 116b may correspond to PCI or PCI-X interfaces. Notwithstanding, the invention is not limited in this regard.

Figure 2:
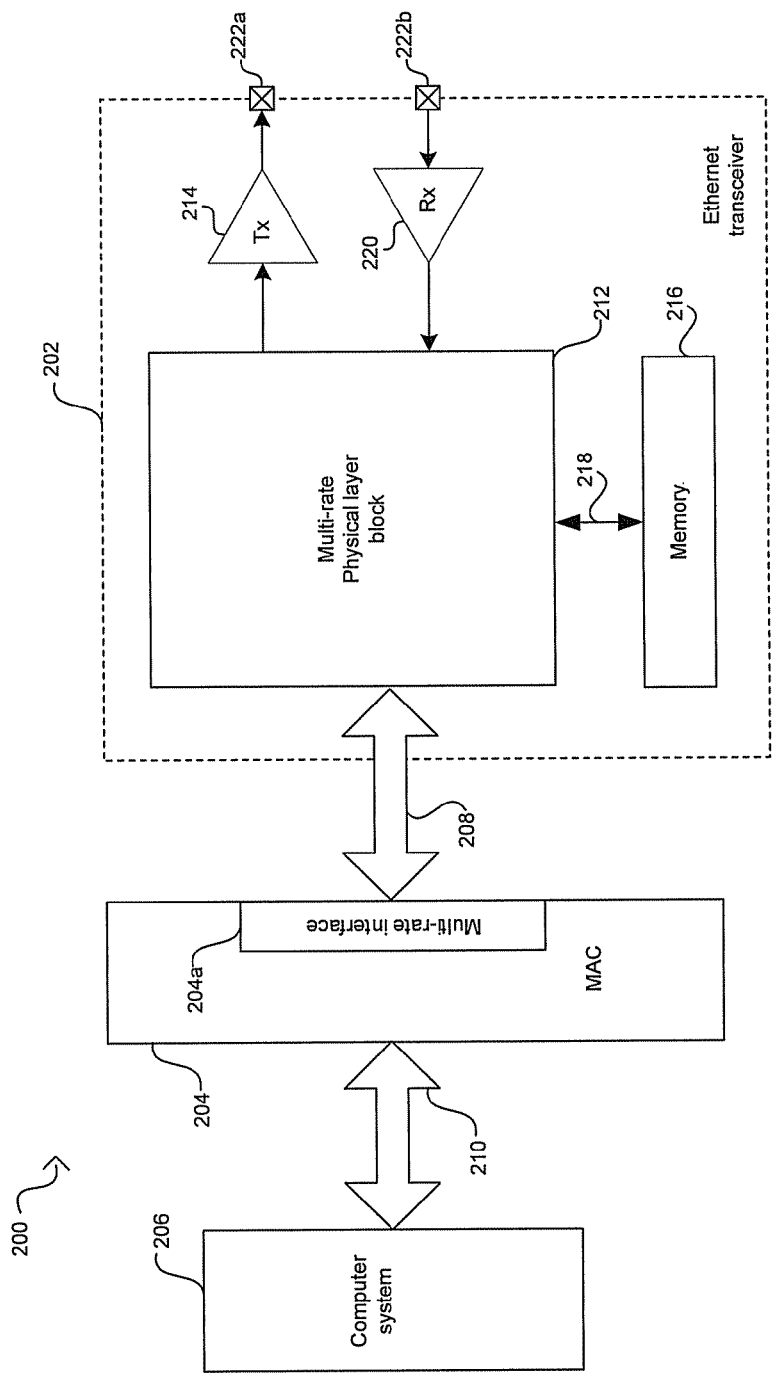
FIG. 2 is a block diagram illustrating an exemplary Ethernet PHY device architecture comprising a multi-rate physical layer block, in connection with an embodiment of the invention.

FIG. 2 is a block diagram illustrating an exemplary Ethernet over twisted pair PHY device architecture comprising a multi-rate physical block, in connection with an embodiment of the invention. Referring to FIG. 2, there is shown a link partner 200 that comprises an Ethernet over twisted pair PHY device 202, a MAC controller 204, a computer system 206, an interface 208, and a bus controller interface 210. The PHY device 202 may be an integrated device that comprises a multi-rate physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the computer system 206, the interface 208, and the bus controller 210 may be the same as or substantially similar to the respective MAC controllers 108a and 108b, computer systems 106a and 106b, interfaces 114a and 114b, and bus controller interfaces 116a and 116b as described in FIG. 1. The MAC controller 204 may comprise a multi-rate interface 204a that may comprise suitable logic, circuitry, and/or code to enable communication with the PHY device 202 at a plurality of data rates via the interface 208.

The multi-rate physical layer block 212 in the PHY device 202 may comprise suitable logic, circuitry, and/or code that may enable operability and/or functionality of physical layer requirements. In this regard, the multi-rate physical layer block 212 may enable generating the appropriate link discovery signaling utilized for establishing communication with a remote PHY device in a remote link partner. In this regard, a 10base-T PHY device may transmit normal link pulses (NLPs) periodically. Similarly, 100Base-TX, 1000Base-T, and 10Gbase-T PHY device may transmit fast link pulse (FLP) bursts, where each burst comprises a train of NLPs. The multi-rate physical layer block 212 may communicate with the MAC controller 204 via the interface 208. In one aspect of the invention, the interface 208 may be a media independent interface (MII) and may be configured to utilize a plurality of serial data lanes for receiving data from the multi-rate physical layer block 212 and/or for transmitting data to the multi-rate physical layer block 212, in order to achieve higher operational speeds such as 1Gbps or 10 Gbps, for example. The multi-rate physical layer block 212 may be configured to operate in one or more of a plurality of communication modes, where each communication mode implements a different communication protocol. These communication modes may include, but are not limited to, Ethernet over twisted pair standards 10Base-T, 100Base-TX, 1000Base-T, 10GBase-T, and other similar protocols that utilize multiple channels between link partners. The multi-rate physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate physical layer block 212 may be coupled to memory 216 through the memory interface 218, which may be implemented as a serial interface or a bus. The memory 216 may comprise suitable logic; circuitry, and/or code that may enable storage or programming of information that includes parameters and/or code that may effectuate the operation of the multi-rate physical layer block 212. The parameters may comprise configuration data and the code may comprise operational code such as software and/or firmware, but the information need not be limited in this regard. Moreover, the parameters may include adaptive filter and/or block coefficients for use by the multi-rate physical layer block 212, for example.

The transmitter 214 may comprise suitable logic, circuitry, and/or code that may enable transmission of data from the link partner 200 to a remote link partner via, for example, the cable 212 in FIG. 1. The receiver 220 may comprise suitable logic, circuitry, and/or code that may enable receiving data from a remote link partner. Each of the transmitter 214 and receiver 220 in the PHY device 202 correspond to a channel that may comprise the cable 112. For example, transmitter 214 and receiver 220 may be utilized to communicate with a remote link partner via two twisted pairs and/or a pair of coaxial cables comprising the cable 112. In this regard, the transmitter/receiver pair may be enabled to provide the appropriate communication rate and mode. Additionally, the transmitter 214 may transmit utilizing single-ended (unbalanced), and/or differential (balanced) signaling methods, and the receiver 220 may receive single-ended (unbalanced), and/or differential (balanced) signals.

The input/output interfaces 222 may comprise suitable logic circuitry, and/or code that may enable the PHY device 202 to impress signal information onto a physical medium comprising a channel such as the channel 112 disclosed in FIG. 1. Consequently, the input/output interfaces 222a and 222b may, for example, provide conversion between differential and single-ended, balanced and unbalanced, signaling methods. In this regard, the conversion may depend on the signaling method utilized by the transmitter 214, the receiver 220, and the type of medium comprising the channel. Accordingly, the input/output interfaces 222a and 222b may comprise one or more baluns and/or transformers and may, for example, enable transmission over coaxial cable and/or twisted pair. Additionally, the input/output interfaces 222a and 222b may be internal or external to the PHY device 202. In this regard, if the PHY device 202 comprises an integrated circuit, then "internal" may refer to being "on-chip" and/or sharing the same substrate. Similarly, if the PHY device 202 comprises one or more discrete components, then "internal" may refer to being on the same printed circuit board or being within a common physical package.

Figure 3A:
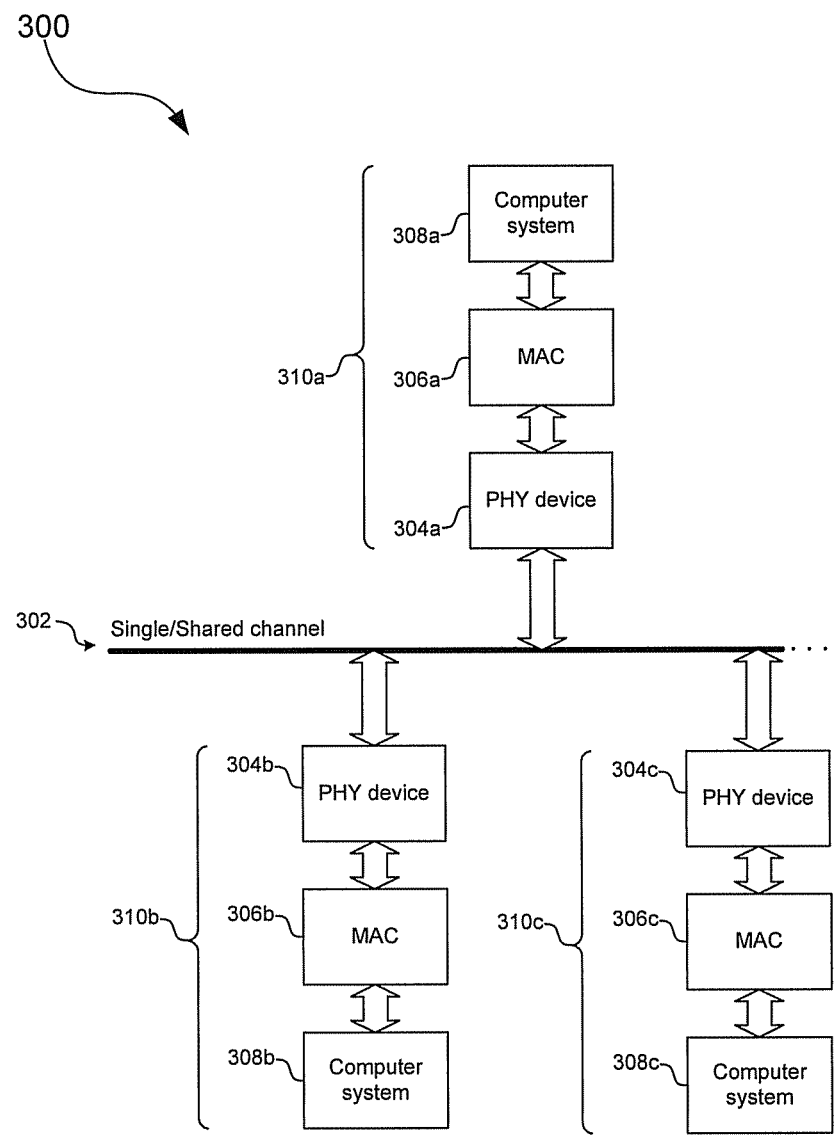
FIG. 3a is a diagram of a shared channel connecting more than two Ethernet PHY device, in accordance with an embodiment of the invention.

FIG. 3a is a diagram of a network comprising a shared channel connecting two or more link partners, in accordance with an embodiment of the invention. In this regard, contrary to the network 100, the network 300 does not comprise two dedicated channels between link partners, but rather a single channel routed to multiple link partners. Referring to FIG. 3a, the network 300 may comprise a shared channel 302, and two or more link partners 310.

The shared channel 302 may, for example, comprise a coaxial cable or a twisted pair. In this regard, the shared channel may be pre-existing wiring in a MTU/MDU such as coaxial cable for distribution of television signals.

The link partners 310 may each comprise a computer system 308, a (MAC) controller 306, and a PHY device 304. In this regard, the link partners 310 may be similar to or the same as the link partner 200 of FIG. 2. Notwithstanding, the invention is not limited in this regard.

The computer systems 306 may represent layer 3 and above of the OSI Reference model. In this regard, the computer systems may be similar to or the same as the computer systems 106 in FIG. 1.

The MAC controllers 306a, 306b, and 306c may comprise a media independent and/or multi-rate interface that may comprise suitable logic, circuitry, and/or code to enable communication with their respective PHY devices 304a, 304b, and 304c at a plurality of data rates. In this regard, the MAC controllers 306a, 306b, and 306c may be substantially similar to the MAC controller 204 disclosed in FIG. 2. However, the MAC controllers 306a, 306b, and 306c may additionally enable controlling access to the shared channel 302. Consequently, the MAC controllers 306a, 306b, and 306c may enable the prevention of data collisions on the shared channel. In this manner, the MAC controllers 306a, 306b, and 306c may enable providing one or more control signals to the PHY devices 304a, 304b, and 304c such that the PHY devices 304a, 304b, and 304c only transmit onto the shared channel at determined times, thus preventing collisions. Consequently, aspects of the invention may represent an improvement over CSMA/CD networks in that the length of the channel 302 may not be limited by a collision domain, network throughput may be unaffected by collisions, and performance of applications such as VoIP may be improved by using fixed time intervals. Additionally, Also, the MAC controllers 306a, 306b, and 306c may enable providing one or more control signals to the PHY devices 304a, 304b, and 304c such that PHY devices 304a, 304b, and 304c do not receive their own transmissions. In this regard, a PHY device 304 receiving its own transmissions may incorrectly detect that another link partner is present and may try to establish a connection with that partner.

The PHY devices 304a, 304b, and 304c may comprise suitable logic, circuitry, and/or code that may enable transmission and reception of data between the link partners 310a, 310b, and 310c. In this regard, the PHY devices 304a, 304b, and 304c may be similar to the Ethernet over twisted pair PHY device 202 disclosed in FIG. 2. However, the PHY devices 304a, 304b, and 304c may be configured to enable communication over a single/shared channel, as opposed to the PHY device 202 that requires two or more channels. In this regard, the PHY devices 304a, 304b, and 304c may enable disabling transmit and/or a receive functions. Similarly, the PHY devices 304a, 304b, and 304c may enable disconnecting a transmitter and/or a receiver from the shared channel.

In an exemplary operation, at time t1, the MAC controller 306a may provide data to the PHY device 304a for transmission. Also at time t1, the MAC controller 306a may provide a control signal to PHY device 304a to disable reception of data over the shared channel 302 by the PHY device 304a. Additionally, at time t1, the MAC controllers 306b and 306c may provide control signals to PHY devices 304b and 304c, respectively, to disable transmission of data onto the shared channel 302 by PHY devices 304b, and 304c. In this manner, data collisions on the share channel may be prevented. Transmission by PHY devices 304b and 304c and reception by PHY device 304a may occur in a similar manner.

Figure 3B:
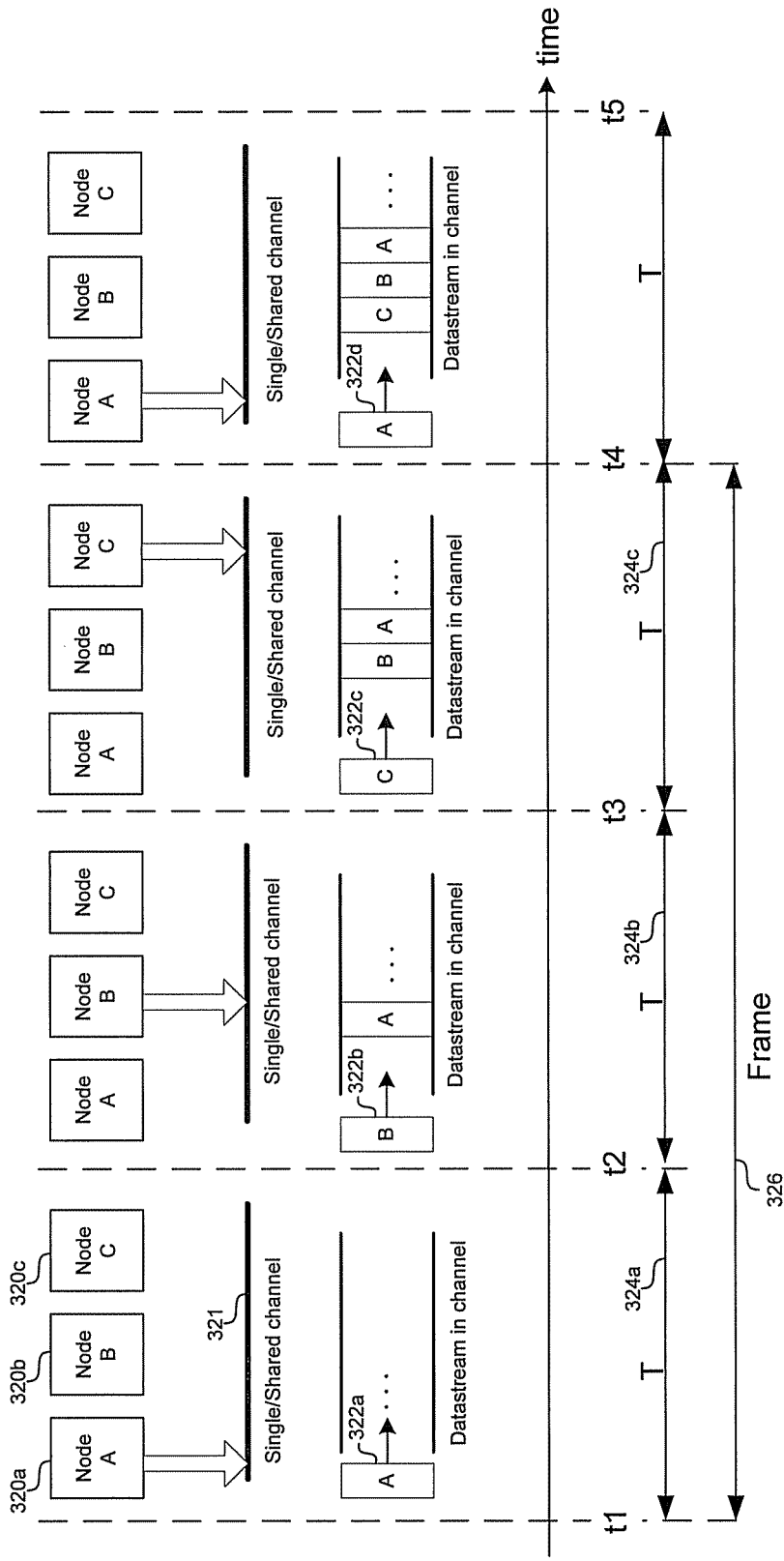
FIG. 3b is a diagram illustrating time division multiplexing of a shared channel in accordance with an embodiment of the invention.

FIG. 3b is a diagram illustrating time division multiplexing of a shared channel in accordance with an embodiment of the invention. Referring to FIG. 3b there is shown three network nodes 322a, 322b, 322c, similar to or the same as the nodes 310 of FIG. 3a, that transmit into a shared channel 321, similar to or the same as the shared channel 302, utilizing a time division multiplexing scheme.

In operation, the nodes 320a, 320b, and 320c may each be assigned time intervals during which they may transmit into the shared channel 321. In one embodiment of the invention, time may be divided into a series of frames 326 and each frame may be split into a number of intervals 324. In this regard, a frame may be divided into a number of intervals corresponding to the number of nodes sharing the channel. Accordingly, each node may transmit a block of data 322 into the channel during an assigned interval. In the exemplary embodiment of the invention, the node 320a may transmit the data 322a into the channel 321 during the time interval 324a, the node 320b may transmit the data 322b into the channel 321 during the time interval 324c, and the node 320c may transmit the data 322b into the channel 321 during the time interval 324c. At the completion of the frame 326, a new frame may begin and the node 320a may again be granted access to the shared channel 321, followed by the node 320b, and so on. In this manner, access to the channel 321 may continually be passed between the nodes 320 in successive time intervals.

Although each node may be assigned a fixed time interval in each frame, the invention is not limited in this regard and other schemes for time division multiplexing may be utilized. For example, certain nodes may require access more frequently than others and thus may be allotted longer and/or more time intervals. In another example, nodes may enable negotiating time intervals with other nodes. In this regard, a first node may initially be allocated a time interval which it may not use for a certain number of time frames. Accordingly, the first node may temporarily dedicate its time interval to a second node. In another embodiment of the invention, one node utilizing a shared channel may be master and other nodes sharing the channel may be slaves. In this manner, the master may be enabled to allocate time intervals to the slaves.

Figure 4:
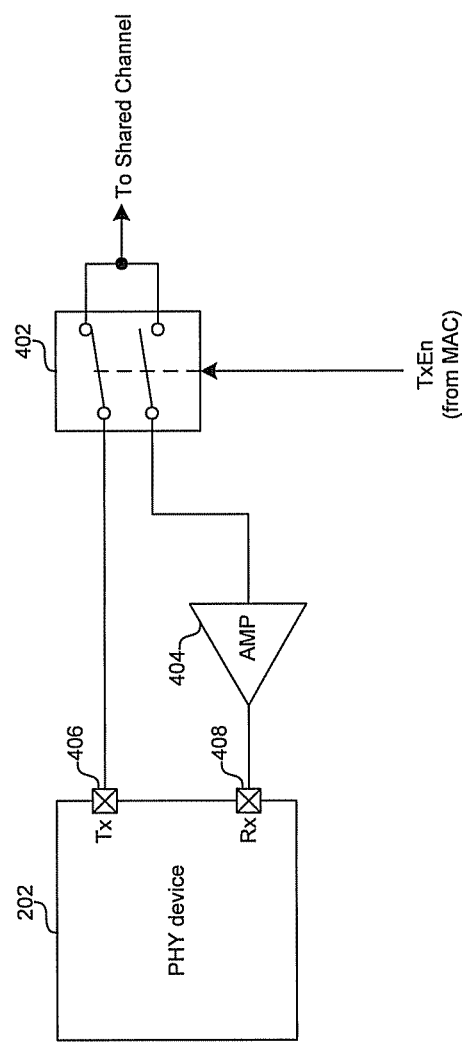
FIG. 4 is a block diagram of an Ethernet over twisted pair PHY device externally configured to enable communication over a shared channel, in accordance with an embodiment of the invention.

FIG. 4 is a block diagram of an Ethernet over twisted pair PHY device externally configured to enable communication over a shared channel, in accordance with an embodiment of the invention. Referring to FIG. 4, an Ethernet over twisted pair PHY device such as the PHY device 202 disclosed in FIG. 2 may be configured to enable communication over a shared channel utilizing a switching element 402 and an amplifier 404.

The switching element 402 may comprise suitable logic, circuitry, and/or code that may enable communicatively coupling/decoupling the receiver input 408 and/or transmitter output 406 to/from a shared channel, such as the channel 302 in FIG. 3a. In this regard, the switching element 402 may be controlled by one or more signals that may be generated by a MAC controller, such as the MAC controller 306 disclosed in FIG. 3b.

The amplifier 404 may comprise suitable logic, circuitry, and or code that may enable amplifying signals received from a shared channel via the switching element 402. In this regard, the amplifier may, for example, enable compensating for signal loss introduced by the switching element 402. In various embodiments of the invention, the amplifier 404 may enable applying varying amounts of gain to the signal or, alternatively, the amplifier 404 may not be necessary.

In an exemplary operation, a transmit enable (TxEn) signal may be received from a MAC controller, such as the MAC controller 306. Accordingly, TxEn being asserted may cause the transmitter output 406 to be communicatively coupled to the shared channel and the receiver input 410 to be communicatively decoupled from the shared channel. Similarly, the TxEn being de-asserted may cause the transmitter output 406 to be communicatively decoupled to the shared channel and the receiver input 410 to be communicatively coupled from the shared channel.

Figure 5:
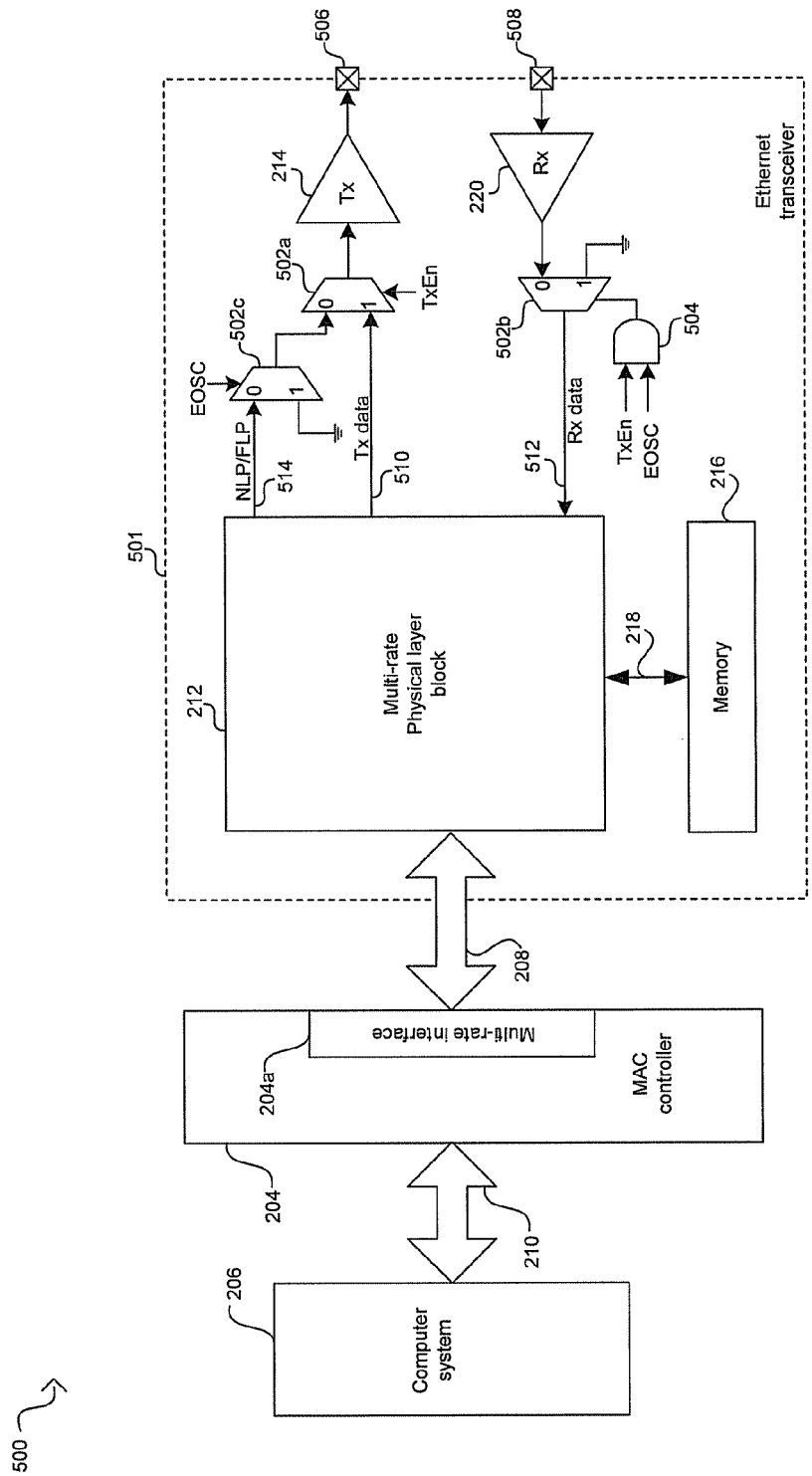
FIG. 5 is a block diagram of an Ethernet over twisted pair PHY device internally configured to enable communication over a shared channel, in accordance with an embodiment of the invention.

FIG. 5 is a block diagram of an Ethernet over twisted pair PHY device externally configured to enable communication over a shared channel, in accordance with an embodiment of the invention. Referring to FIG. 5, an Ethernet over twisted pair PHY device 501, similar to the PHY device 202 disclosed in FIG. 2, may be configured utilizing switching elements 502a, 502b, and 502c and a logic block 504.

The switching element 502a may comprise suitable logic, circuitry, and/or code that may enable communicatively coupling/decoupling of the transmit output 510 of the multi-rate physical layer block 212 to/from the transmitter output 506 of the PHY device 501. In this regard, the switching element 502a may be controlled by one or more signals. For example, the switching element 502a may receive a TxEn signal from the MAC controller 204, and when TxEn is asserted, the transmit output 510 of the multi-rate physical layer block 212 may be communicatively coupled to the output interface 506 of the PHY device 501.

The switching element 502b may comprise suitable logic, circuitry, and/or code that may enable communicatively coupling/decoupling the receive input 512 of the physical layer block 212 to/from the receive input 508 of the PHY device 501. In this regard, the switching element 502b may be controlled by one or more signals. For example, the switching element 502b may receive a TxEn signal from the MAC controller 204, and when TxEn is de-asserted, the receive input 512 of the physical layer block 212 may be communicatively coupled to the input interface 508 of the PHY device 501. Additionally, the TxEn signal may pass through the logic block 504 along with an Ethernet over shared channel (EOSC) signal from the MAC controller 204. In this regard, the EOSC being asserted may indicate the PHY device 501 may be connected to a shared channel, while EOSC being de-asserted may indicate that the PHY device 501 may be connected to two dedicated channels. Accordingly, the PHY device may be compatible with standard Ethernet over twisted pair networks as well as shared channel networks.

The switching element 502c may comprise suitable logic, circuitry, and/or code that may enable communicatively coupling/decoupling an NLP/FLP output 514 of the physical layer block 212 to/from the transmitter output 506. In this regard, the switching element 502c may be controlled by one or more signals. For example, the switching element 502c may receive the EOSC signal, and when EOSC is 1, the NLP/FLP output 514, may be communicatively decoupled from the transmitter output 506. In this manner, when connected to a shared channel, the PHY device 501 will not transmit periodic NLPs and/or FLPs that may cause data collisions on the shared channel.

The logic block 504 may comprise suitable logic, circuitry, and/or code that may enable performing one or more logic operations on one or more control signals. In an exemplary embodiment of the invention, the logic block 504 may comprise a single AND gate operating on the TxEn and EOSC control signals.

Figure 6:
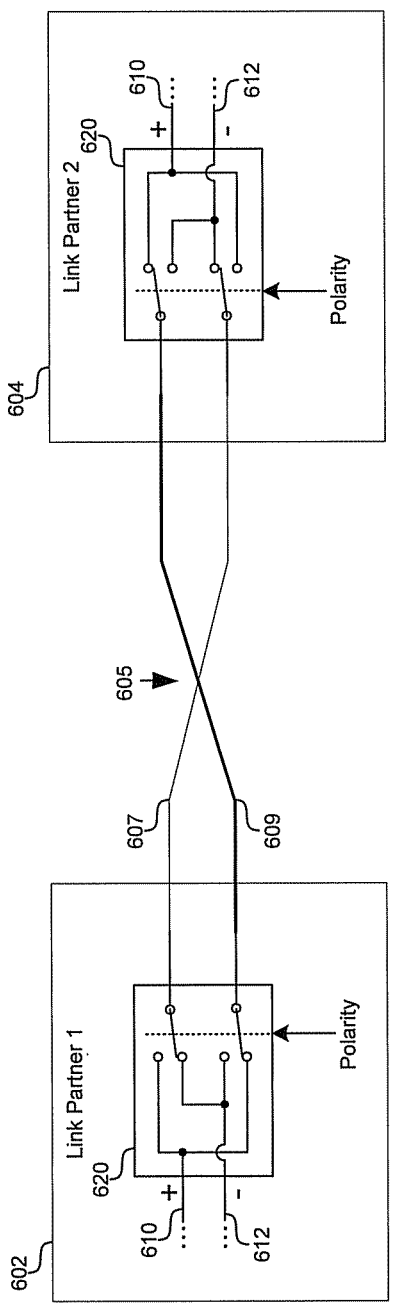
FIG. 6 is a block diagram illustrating polarity inversion in an Ethernet channel, in accordance with an embodiment of the invention.

FIG. 6 is a block diagram illustrating polarity inversion in an Ethernet channel, in accordance with an embodiment of the invention. Referring to FIG. 6a there is shown two link partners 602 and 604, which may be similar to or the same as, for example, the link partners 102, 104 (FIG. 1), 310 (FIG. 3), or 500 (FIG. 5). As shown in FIG. 6a a polarity inversion 605 may be present in a channel connecting two link partners. Accordingly, link partners may be enabled to compensate for link inversion by, for example, altering the polarity of a transmitter and/or receiver.

In operation, a polarity inversion may be present due, for example, to a swapping of the wires 607 and 609 comprising a twisted pair cable. Accordingly, link partners may be enabled to locally (e.g. internally) invert the leads comprising a wire pair such that data is transmitted and/or received with the correct polarity. In this regard, the switching element 620 may enable locally compensating for a polarity inversion via the "polarity" control signal. Accordingly, as depicted in FIG. 6, switching elements 620 comprising the link partners 602 and 604 may be configured such that a positive terminal 612 of the link partner 602 may be communicatively coupled to a positive terminal 612 of the link partner 604 and negative terminal 614 comprising the link partner 602 may be communicatively coupled to a negative terminal 614 of the link partner 604.

Figure 7:
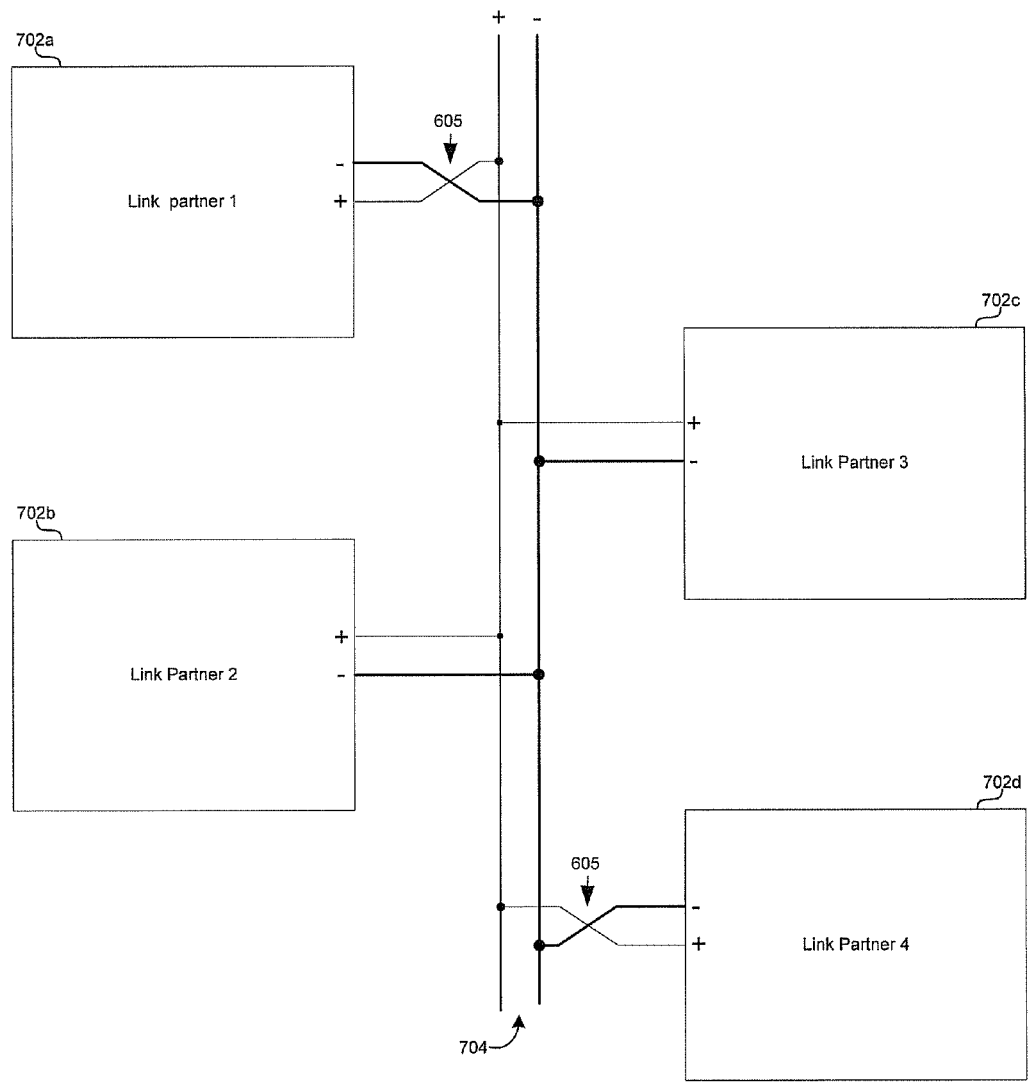
FIG. 7 is a diagram illustrating polarity inversion in a shared channel network, in accordance with an embodiment of the invention.

FIG. 7 is a diagram illustrating polarity inversion in a shared channel network, in accordance with an embodiment of the invention. Referring to FIG. 7 there is shown four link partners 702a, 702b, 702c and 702d connected to a shared channel 704. The link partners 702a, 702b, 702c, and 702c may be similar to or the same as the link partners 602 and 604 of FIG. 6. Accordingly, switching elements, such as the switching element 620, comprising the link partners 702a, 702b, 702c, and 702d may be configured such that a positive terminal of each the link partners 702a, 702b, 702c, and 702d may be communicatively coupled to a positive wire comprising the shared channel 704 and a negative terminal of each the link partners 702a, 702b, 702c, and 702d may be communicatively coupled to a negative wire comprising the shared channel 704. In this manner, twisted pair cables with or without polarity inversions may be utilized to connect the link partners 702 to the shared channel 704.

In the exemplary network 700 depicted, the link partners 702a and 702d may be inverted with respect to the link partners 702b and 702c. Accordingly, in order to prevent the link partners 702a, 702b, 702c, and 702 from continually having to detect and adjust for polarity inversions, the exemplary steps in FIG. 8 may be utilized for configuring polarity of link partners connected to a shared channel.

Figure 8:
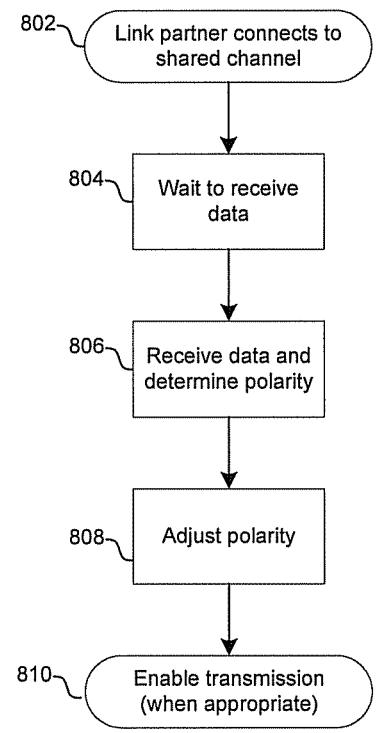
FIG. 8 is a flow chart illustrating exemplary steps for configuring a polarity of data transmitted onto a shared channel, in accordance with an embodiment of the invention.

FIG. 8 is a flow chart illustrating exemplary steps for configuring a polarity of data transmitted onto a shared channel, in accordance with an embodiment of the invention. Referring to FIG. 8 the exemplary steps may begin with step 802 when a link partner connects to a shared channel. Subsequent to step 802, the exemplary steps may advance to step 804. In step 804, the link partner may wait to receive data from the network. In this regard, the link partner may be prevented from transmitting onto the shared channel until it may determine the polarity of the shared channel. Subsequent to step 804, the exemplary steps may advance to step 806. In step 806, the link partner may receive data from the shared channel and may determine the polarity of the received data. Subsequent to step 806 the exemplary steps may advance to step 808. In step 808, a transmitter and/or a receiver comprising the link partner may be configured such that data is transmitted and received with the correct polarity. Subsequent to step 808 the exemplary steps may advance to step 810. In step 810, the link partner may be enabled to transmit data onto the shared channel when appropriate, for example, during a time interval dedicated to the link partner.

Aspects of a method and system for utilizing a 10/100/1G/10GBase-T physical layer PHY device, such as the PHY device 202 of FIG. 2, for single channel and shared channel networks are provided. In this regard, at least one switching element, such as the switching element 402, 502*a*, 502*b*, and/or 502*c* may be utilized to configure an Ethernet over twisted pair PHY device for communication over a single and/or shared channel. In this regard, the switching element may enable switching between a transmitter, such as the transmitter 214, being coupled to a shared channel and a receiver, such as the receiver 220, being coupled to a shared channel. Additionally, the switching elements may be controlled based on whether the PHY device is to transmit or receive and whether the transmitter is connected to a standard 10/100/1G/10GBase-T network, or to a single and/or shared channel network, for example. In this regard, control signals such as then TxEN and/or EOSC signals disclosed in FIG. 5 may be utilized to control the switching elements. In this manner, the configured PHY device may remain compatible with existing Ethernet networks. The PHY device may be configured externally, as disclosed in FIG. 4, for example; or internally, as disclosed in FIG. 5, for example. The PHY device may be enabled to configure the polarity, as in FIG. 6, of transmitted and/or received data based on a polarity of data received from a shared channel.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling communication comprising:
in an Ethernet over twisted pair device configured to communicate over one of a coaxial cable and a twisted pair cable shared channel with two or more link partners:
configuring a plurality of switching elements within a physical layer transceiver (PHY) of said Ethernet over twisted pair device to decouple a transmitter output of said PHY from said shared channel until a polarity of said shared channel is determined;
determining said polarity of said shared channel based on data received from said shared channel at a receiver input of said PHY;
configuring said plurality of switching elements to adjust a polarity of said transmitter output based on said polarity of said shared channel;
configuring said plurality of switching elements such that said PHY is operable to transmit data over said shared channel with said two or more link partners during a plurality of assigned time intervals in accordance with said adjusted polarity of said transmitter output, wherein:
said configuring said plurality of switching elements is controlled via one or more control signals generated by a MAC controller of said Ethernet over twisted pair device.

2. The method of claim 1, wherein a length of each of said plurality of assigned time intervals is fixed.

3. The method of claim 1, further comprising:
allocating each of said plurality of assigned time intervals, during which transmission onto said shared channel may occur, to one of said Ethernet over twisted pair device and said two or more link partners.

4. The method of claim 3, further comprising:
reallocating each of said plurality of assigned time intervals which are unused from one of said Ethernet over twisted pair device and said two or more link partners to another of said Ethernet over twisted pair device and said two or more link partners.

5. The method of claim 1, wherein said one or more control signals comprise a transmit enable signal generated during said plurality of assigned time intervals.

6. The method of claim 5, further comprising:
coupling said transmitter output to said shared channel and decoupling said receiver input from said shared channel when said transmit enable signal is generated; and
coupling said receiver input to said shared channel and decoupling said transmitter output from said shared channel when said transmit enable signal is not generated.

7. The method of claim 1, wherein said Ethernet over twisted pair device is a master device configured to allocate said plurality of assigned time intervals.

8. The method of claim 1, wherein each of said two or more link partners comprise a PHY and a MAC controller.

9. The method of claim 1, wherein said Ethernet over twisted pair device and said two or more link partners comprise a single collision domain on said shared channel.

10. A system for enabling communication comprising:
one or more circuits disposed within an Ethernet over twisted pair device configured to communicate over one of a coaxial cable and a twisted pair cable shared channel with two or more link partners, said one or more circuits configured to:
configure a plurality of switching elements disposed within a physical layer transceiver (PHY) of said Ethernet over twisted pair device to decouple a transmitter output of said PHY from said shared channel until a polarity of said shared channel is determined;

determine said polarity of said shared channel based on data received from said shared channel at a receiver input of said PHY;

configure said plurality of switching elements to adjust a polarity of said transmitter output based on said polarity of said shared channel;

configure said plurality of switching elements such that said PHY is operable to transmit data over said shared channel with said two or more link partners during a plurality of assigned time intervals in accordance with said adjusted polarity of said transmitter output, wherein:

said plurality of switching elements are controlled by one or more control signals generated by a MAC controller of said Ethernet over twisted pair device.

11. The system of claim 10, wherein a length of each of said plurality of assigned time intervals is fixed.

12. The system of claim 10, wherein said Ethernet over twisted pair device is configured to allocate each of said plurality of assigned time intervals, during which transmission onto said shared channel may occur, to one of said Ethernet over twisted pair device and said two or more link partners.

13. The system of claim 12, wherein said Ethernet over twisted pair device is configured to reallocate each of said plurality of assigned time intervals which are unused from one of said Ethernet over twisted pair device and said two or more link partners to another of said Ethernet over twisted pair device and said two or more link partners.

14. The system of claim 12, wherein said one or more control signals comprise a transmit enable signal which is generated during any of said plurality of assigned time intervals.

15. The system of claim 14, wherein said plurality of switching elements are operable to:

couple said transmitter output to said shared channel and decouple said receiver input from said shared channel when said transmit enable signal is generated; and couple said receiver input to said shared channel and decouple said transmitter output from said shared channel when said transmit enable signal is not generated.

16. The system of claim 10, wherein said Ethernet over twisted pair device is a master device configured to allocate said plurality of assigned time intervals to one of said Ethernet over twisted pair device and said two or more link partners.

17. The system of claim 10, wherein each of said two or more link partners comprise a PHY and a MAC controller.

18. The system of claim 10, wherein said Ethernet over twisted pair device and said two or more link partners comprise a single collision domain on said shared channel.

* * * * *